Dec. 23, 1947.  W. R. MERCER  2,433,287
COMPARATOR CIRCUIT
Filed May 4, 1944
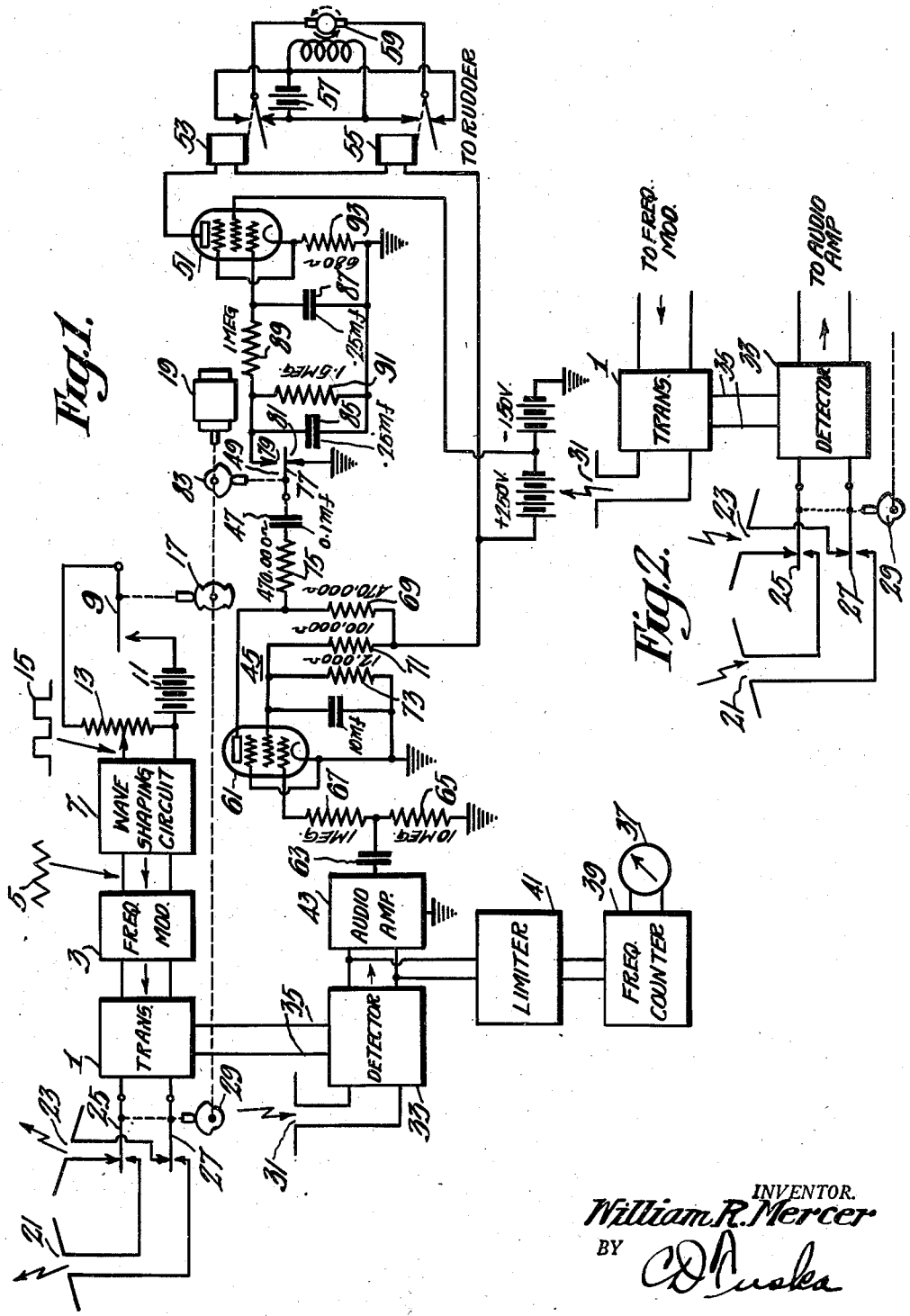
INVENTOR.
William R. Mercer
BY
ATTORNEY Patented Dec. 23, 1947

2,433,287

UNITED STATES PATENT OFFICE 2,433,287

COMPARATOR CIRCUIT

William R. Mercer, Hightstown, N. J., assignor to Radio Corporation of America, a corporation of Delaware Application May 4, 1944, Serial No. 534,114

6 Claims. (Cl. 250—1.72)

This invention relates to radio locator apparatus, and particularly to amplitude comparator circuits for target seeking devices and the like, wherein signals are directively radiated toward a selected target, picked up after reflection thereby, and the received signals employed to control the energization of a steering motor or similar device.

In the practice of the present invention, it is proposed to radiate signals alternately in two overlapping directive patterns, and compare the amplitude of signal reflected with one radiation pattern with that of the signal reflected with the other radiation pattern. If the two amplitudes are equal, the reflecting target lies on the equi-signal line of intersection of the alternate radiation lobes. If the signals are unequal, the target lies in the lobe from which the greater signal is reflected. In order to provide response to the inequality of the reflected signals, a circuit capable of comparing the amplitudes of the signals received during successive periods of radiation in alternate directive patterns is required. In copending application Serial No. 527,292 filed by R. C. Sanders, Jr. on March 20, 1944, and entitled Comparator circuits for radio locators, certain circuits for this purpose are described and claimed.

The principal object of the present invention is to provide an improved circuit of the general type disclosed in said copending application. Another object is to provide improved methods of and means for controlling an electric motor or the like as a function of the relative amplitudes of two alternately occurring signals. A further object is to provide an improved comparator circuit requiring a minimum of electron discharge tubes and other circuit elements yet capable of providing accurate comparison of the amplitudes of alternate signals.

The invention will be described with reference to the accompanying drawing, of which Figure 1 is a schematic diagram of a radio target seeking system adapted for controlling the direction of flight of an aircraft in response to reflected signals, and Figure 2 is a diagram illustrating a modification of the antenna arrangement of Figure 1.

The drawing shows one embodiment of the invention applied to a frequency modulated radio locator system comprising a radio transmitter 1 which is cyclically frequency modulated by a frequency modulator 3, such as a variable capacitor unit, in response to a modulated signal 5 applied thereto from a wave shaping circuit 7.

In the example illustrated, the modulating signal 5 is of triangular wave shape.

The triangular wave 5 is produced by periodically opening and closing a switch 9 in series with a battery 11 and a voltage divider 13. This generates a voltage of square wave form 15 that is applied to the wave shaping circuit 7 to obtain the voltage of triangular wave form 5. In this case, the wave shaping circuit 7 may be merely an integrating circuit. The switch 9 is operated by a cam 17 driven by a motor 19.

The output of the transmitter 1 is radiated alternately from a pair of directive antennas 21 and 23. This is accomplished by means of a switch comprising switch arms 25 and 27 connected together mechanically for operation by means of a cam 29. The cam 29 is connected to the motor 19. After reflection from a target the frequency modulated signals are received by a directive antenna 31 and applied to a beat frequency detector 33. The frequency modulated signals are also supplied to the detector 33 over a line 35 directly from the transmitter 1, whereby the frequency of the beat output of the detector 33 is proportional to the distance to the target. This distance may be indicated by a meter 37 connected to the output circuit of a frequency counter 39, which is connected to the output of the detector 33 through a limiter 41. For obtaining directional information, output signal from the detector 33 is applied to an audio amplifier 43 connected to an amplitude comparator circuit comprising a rectifier 45, a storage capacitor 47 and synchronous switch 49, and a relay amplifier 51. The output circuit of the amplifier 51 includes a pair of relays 53 and 55, each provided with single pole double throw contact arrangements for connecting a battery 57 to a motor 59.

The rectifier 45 comprises a grid leak type detector circuit including an electron discharge tube 61 provided with a grid capacitor 63, grid leak 65, grid current limiting resistor 67, and a load resistor 69. In the illustrated circuit, the tube 61 is of the pentode type, with screen potential provided by a voltage divider including resistors 71 and 73 connected across the anode supply voltage.

The anode of the tube 61 is connected through a resistor 75 to one terminal of the capacitor 47. The other terminal of the capacitor 47 is connected to the moving contact 77 of the switch 49, which includes two fixed contacts 79 and 81. The contact 77 is operated by means of a cam 83 connected to the motor 19, in synchronism with the switches 25 and 27. The contact 81 is connected to ground. The contact 79 is connected to the amplifier 51 through a low pass filter circuit comprising capacitors 85 and 87 and a resistor 89. A resistor 91 is connected across the capacitor 85, and together with a resistor 89 constitutes a grid leak for the amplifier 51.

The relays 53 and 55 are adjusted so that the drop out current of relay 53 exceeds the pick up current of relay 55 by a small amount. For example, the relay 53 may be adjusted to pick up with a current of 4.6 milliamperes and drop out at 4 milliamperes, while the relay 55 is adjusted to pick up at 2.6 milliamperes and drop out at 2 milliamperes. Thus, when the output current of the amplifier 51 is less than 2 milliamperes, both relay armatures are in their lower positions as indicated in solid lines in the drawing. When the current is between 2.6 milliamperes and 4 milliamperes, the armature of the relay 55 will be in its upper position as indicated in dash line, while the armature of the relay 53 will remain in its lower position. When the current is greater than 4.6 milliamperes, the armatures of both relays will be in their upper (dash line) positions. Thus, when the output current of the amplifier 51 has a value within the range of 2.6 to 4 milliamperes, the armature of the motor 59 is disconnected from the battery 57 and short-circuited. When the output current is above this range, the motor 59 is connected to run in one direction, and when the current is below 2 milliamperes, the motor is connected to run in the opposite direction. The motor 59 may be mechanically connected to the rudder or other steering mechanism (not shown) of a mobile craft carrying the equipment.

In the operation of the above-described system, the motor 19 drives the cam 17 to modulate the transmitter 1, and the cams 29 and 83, to switch the antennas and the comparator circuit. The cam 17 includes two lobes, while the cams 29 and 83 each include one lobe. The purpose of this arrangement is to provide a complete frequency modulation cycle during each period of transmission on each of the antennas 21 and 23. The amplitude of the beat output of the detector 33 depends upon the strength of the reflected signal. Hence, if the reflecting target is on the equi-signal line of the directive patterns of the antennas 21 and 23, the beat output will not vary in amplitude with the operation of the switches 25, 27 and 49. However, if the target is to the left of the equi-signal line, a stronger signal will be received during the time that the antenna 21 is being used for transmission and weaker during the time that the antenna 23 is used, causing the beat output of the detector 33 to have a substantially square wave amplitude envelope. The phase of this envelope with respect to the switching cycle is constant. Similarly if the target is to the right of the equi-signal line, a similar square wave envelope will be produced but of opposite phase.

The tube 61 is biased by its own grid current. Thus, when the amplitude of the output of the amplifier 43 is low, the average anode current of the tube 61 is high, and vice versa. Inasmuch as the anode current through the tube 61 is necessarily unidirectional, the output voltage appearing across the load resistor 69 is unidirectional, following the envelope of the output of the amplifier 43, but in opposite phase. During the time that the antenna 23 is connected to the transmitter 1, the capacitor 47 is connected to ground through switch 49. The capacitor 47 is thus charged to a voltage depending upon the strength of the reflected signal, in the polarity indicated by the signs + and −. The value of the resistor 75 is selected with respect to that of the capacitor 47 to provide charging to a value between the peak value and the average value of the voltage across the load resistor 69. When the antenna 21 is connected to the transmitter 1, the capacitor 47 is connected to the input circuit of the amplifier 51. The voltage drop at this time across the load resistor 69 depends upon the strength of the signal reflected from the target in response to transmission of the antenna 21.

The voltage at the upper end of the resistor 69 is positive with respect to ground. Thus the voltage applied to the input circuit of the amplifier 51 is the difference between that at the upper end of the resistor 69 and that to which the capacitor 47 is charged. If the reflected signal is larger from the antenna 23 than the antenna 21, the average voltage applied to the amplifier 51 will be positive, since the capacitor 47 will be charged to a lower voltage than the voltage existing at the anode of the tube 61 while the antenna 21 is connected. Similarly, the voltage at the input of the amplifier 51 will be negative if the reflected signal from the antenna 23 is larger than that from the antenna 21. When the reflected signals are equal, the input voltage to the amplifier 51 is zero. The amplifier 51 is biased by means of a cathode resistor 93 to provide an anode current of approximately three milliamperes, when the input signal is zero. Thus, when the target is off to the left of the equi-signal line, the anode current is decreased and the armatures of the relays 53 and 55 fall to their lower positions connecting the motor 59 for rotation in one direction, for example clockwise. When the target is off to the right of the equi-signal line, the motor 59 is similarly energized to rotate counter-clockwise.

In the described embodiment of the invention, the transmitting antennas are alternately energized to provide overlapping radiation lobes, and the receiving antenna is directed along the equi-signal line. Although this arrangement is preferred at present, it will be apparent that a single transmitting antenna may be used, with switched receiving antennas as illustrated by Figure 2, or both the transmitting and receiving antenna systems may be switched to provide overlapping directive patterns.

As a matter of practice, it is not possible to arrange the switches 25 and 27 to change the connections of the transmitter 1 instantaneously from one of the antennas to the other. The designer is confronted with the choice of having both antennas connected to the transmitter during the switching period, or having both antennas disconnected from the transmitter during the switching period. The former alternative is to be preferred, since the variation of the impedance presented to the transmitter by this method is only 2:1. A similar choice must be made with reference to the switch 49. In this case, the moving contact 77 must be disconnected from both of the stationary contacts during the switching period, rather than connected to both of them, since the capacitor 85 would otherwise be discharged during each operation of the switch, producing serious transient disturbances. It should be noted that the lengths of the periods during which the switch 49 is closed in each of its two positions will affect only the sensitivity of the system, since the capacitor 47 will not be fully charged within the time during which the contact 77 is connected to either side. However, since the average charging current must equal the average discharge, the calibration is independent of the relative durations of the connection periods. Thus, no serious requirement is placed upon the switch 49 with regard to matching the lengths of the periods of alternate connection.

The relays 53 and 55 are adjusted to provide "dead space" in order to prevent spurious operation of the motor 59 as a result of noise variation in tube characteristic, etc. A single relay provided with equivalent arrangement may be substituted for the relays 53 and 55.

Thus the invention has been described as a radio target seeking device including an improved comparator circuit in which the amplitudes of alternately recurring signals are compared by charging a capacitor in response to one of said signals, and periodically connecting said capacitor in series with a voltage produced by the other of said signals to a utilization circuit.

I claim as my invention:

1. In a radio locator system including radio transmitter means and radio receiver means whereby signals are radiated to and received from a reflecting object, and means for cyclically changing the directive response of said system from one to the other of two alternate overlapping directive patterns, means for comparing the amplitude of the output of said receiver means during periods of operation with one of said directive patterns with the amplitude of the output of said receiver means during periods of operation with the other of said directive patterns, said amplitude comparing means comprising a rectifier connected to said receiver means, a capacitor with one terminal connected to one side of the output circuit of said rectifier and another terminal connected to a double throw switch, one contact of said switch being connected to the other output terminal of said rectifier and the other contact of said switch being connected to a utilization circuit including D.-C. polarity-responsive means.

2. The invention as set forth in claim 1 wherein said D.-C. polarity-responsive means includes a D.-C. amplifier and relay means connected to the output circuit of said amplifier.

3. The invention as set forth in claim 1 wherein said double throw switch is operated synchronously with said cyclical changing of directive response.

4. In a radio locator system including means for producing in a common output circuit two trains of voltage pulses, interlocking in such manner that the pulses of one train alternate with those of the other, means for comparing the amplitudes of said pulses including a capacitor, means for connecting said capacitor across said common output circuit in synchronism with the pulses of one of said trains, a utilization circuit, and means for connecting said capacitor in series with said common output circuit and said utilization circuit in synchronism with the pulses of the other of said trains.

5. A voltage amplitude comparator system for radio target seeking devices and the like, including means for cyclically and alternately producing in a common output circuit two voltages to be compared, a capacitor, means for connecting said capacitor across said common output circuit substantially in synchronism with the occurrence of one of said voltages, a utilization circuit, and means for connecting said capacitor in series with said output circuit and said utilization circuit substantially in synchronism with the occurrence of the other of said voltages.

6. A radio locator system including means for directively transmitting and receiving signals in two overlapping directive lobes alternately, rectifier means connected to said receiver, a capacitor, a utilization circuit, and means for alternately connecting said capacitor across the output circuit of said rectifier means and in series with the output circuit of said rectifier means and said utilization circuit.

WILLIAM R. MERCER.

REFERENCES CITED

The following references are of record in the file of this patent:

UNITED STATES PATENTS

| Number | Name | Date |
|---|---|---|
| 2,176,469 | Moueix | Oct. 17, 1939 |